US011588705B2

United States Patent
Karri et al.

(10) Patent No.: US 11,588,705 B2
(45) Date of Patent: Feb. 21, 2023

(54) VIRTUAL REALITY-BASED NETWORK TRAFFIC LOAD SIMULATION

(71) Applicant: International Business Machines Corporation, Armonk, NY (US)

(72) Inventors: Venkata Vara Prasad Karri, Visakhapatnam (IN); Sarbajit K. Rakshit, Kolkata (IN); Rajesh Gudikoti, Bangalore (IN); Ravi Vadlamani, Peddapuram (IN)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 17/205,116

(22) Filed: Mar. 18, 2021

(65) Prior Publication Data

US 2022/0303189 A1 Sep. 22, 2022

(51) Int. Cl.
*H04L 41/14* (2022.01)
*H04L 67/131* (2022.01)
*H04L 43/50* (2022.01)
*H04L 43/55* (2022.01)

(52) U.S. Cl.
CPC ............ *H04L 41/145* (2013.01); *H04L 43/50* (2013.01); *H04L 43/55* (2022.05); *H04L 67/131* (2022.05)

(58) Field of Classification Search
None
See application file for complete search history.

(56) References Cited

U.S. PATENT DOCUMENTS

| | | | | | |
|---|---|---|---|---|---|
| 5,359,649 | A * | 10/1994 | Rosu | ................... | H04Q 3/0075 379/221.06 |
| 7,313,635 | B1 * | 12/2007 | Zavalkovsky | .......... | H04L 12/66 709/251 |
| 7,734,775 | B2 * | 6/2010 | Barnett | ............... | G06F 11/3495 714/39 |
| 8,291,324 | B2 * | 10/2012 | Battat | .................... | H04L 41/22 709/224 |
| 9,514,567 | B2 * | 12/2016 | Tateishi | ................ | H04L 41/22 |
| 10,291,653 | B2 * | 5/2019 | Senanayake | ........ | H04L 63/1433 |
| 10,616,280 | B2 * | 4/2020 | Purushothaman | .. | H04L 63/1425 |
| 11,159,387 | B1 * | 10/2021 | Klinger | ................. | H04L 41/147 |

(Continued)

OTHER PUBLICATIONS

Edwards, "How AI can improve network capacity planning", Network World, Feb. 5, 2019, 4 pages. https://www.networkworld.com/article/3338100/using-ai-to-improve-network-capacity-planning-what-you-need-to-know.html.

(Continued)

*Primary Examiner* — Kenny S Lin
(74) *Attorney, Agent, or Firm* — Mark Bergner

(57) ABSTRACT

A method, system, and computer program product for virtual reality-based network traffic load simulation are provided. The method monitors a set of activities for a set of applications. A network load simulation for the set of applications is generated based on the set of activities. A contextual change is identified for an application of the set of applications. The method generates a virtual reality visualization of the network load simulation based on the contextual change. A parameter change is detected from a user interaction within the virtual reality visualization of the network load simulation. The method dynamically modifies the network load simulation within the virtual reality visualization in response to the parameter change.

20 Claims, 6 Drawing Sheets

(56) References Cited

U.S. PATENT DOCUMENTS

| | | | |
|---|---|---|---|
| 2003/0151619 A1* | 8/2003 | McBride | H04L 47/11 |
| | | | 715/736 |
| 2007/0067296 A1* | 3/2007 | Malloy | H04L 41/145 |
| 2011/0122776 A1* | 5/2011 | Jacob | H04L 41/22 |
| | | | 370/250 |
| 2018/0018463 A1 | 1/2018 | Grossman et al. | |
| 2018/0077200 A1 | 3/2018 | Apvrille | |
| 2018/0159851 A1 | 6/2018 | Ogrinz et al. | |
| 2018/0176117 A1* | 6/2018 | Gudetee | H04L 41/145 |
| 2018/0234310 A1* | 8/2018 | Ingalls | H04L 43/06 |
| 2019/0068455 A1* | 2/2019 | Randolph | H04W 4/38 |
| 2019/0278621 A1 | 9/2019 | Thomas et al. | |
| 2020/0169476 A1* | 5/2020 | Vela | H04L 43/045 |

OTHER PUBLICATIONS

"Novel System and Method of Simulating IT Systems in Automatic and Scalable Way", Publication Date Nov. 15, 2013, ip.com, IPCOM000232527D, https://priorart.ip.com/IPCOM/000232527, 5 pages.

Badrick, "Digital Twin Technology Could Change How Networks Are Built and Monitored", Turn-Key Technologies, Mar. 21, 2018, 5 pages. https://www.turn-keytechnologies.com/blog/article/digital-twin-technology-could-change-how-networks-are-built-and-monitored/.

Crawshaw, "Digital Twins: A New Tool in the Network Management Arsenal", Devops, Light Reading, Aug. 6, 2018, 8 pages. https://www.lightreading.com/devops/digital-twins-a-new-tool-in-the-network-management-arsenal/a/d-id/745163.

Honeywell, "Improve Your Bottom Line, and Our Environment With Honeywell", printed Feb. 5, 2021, 2 pages. https://discover.honeywell.com/asset-performance-management-6475-registrationpage.html?utm_source=google-adwords&utm_medium=paid-advertisement&utm_campaign=202003-hce-lundincasestudyapm&utm_content=case-study&utm_term=search&gclid=EAIaIQobChMI6ZWVv67n6QIVmH4rCh0k_wh4EAAYASAAEgKOgvD_BwE.

"Network Digital Twins", Scalable Network Technologies, Posted Feb. 26, 2019, 3 pages. https://www.scalable-networks.com/network-digital-twins/#.

Mell et al., "The NIST Definition of Cloud Computing", Recommendations of the National Institute of Standards and Technology, Special Publication 800-145, Sep. 2011, 7 pages.

* cited by examiner

VIRTUAL REALITY-BASED NETWORK TRAFFIC LOAD SIMULATION

BACKGROUND

Data moving across a communications network in a given time period is known as network traffic. This data is generally divided into network packets that form the load placed on the communications network. Systems have been created to measure, control, and simulate network traffic. The data composing network traffic is often largely generated by applications, in an application landscape, communicating with one another through the communications network. Within the application landscape, maintenance is often performed on applications as well as system resources used by those applications. Part of this maintenance includes migrating data from one application to another. These maintenance activities give rise to additional network traffic.

SUMMARY

According to an embodiment described herein, a computer-implemented method for virtual reality-based network traffic load simulation is provided. The method monitors a set of activities for a set of applications. A network load simulation for the set of applications is generated based on the set of activities. A contextual change is identified for an application of the set of applications. The method generates a virtual reality visualization of the network load simulation based on the contextual change. A parameter change is detected from a user interaction within the virtual reality visualization of the network load simulation. The method dynamically modifies the network load simulation within the virtual reality visualization in response to the parameter change.

According to an embodiment described herein, a system for virtual reality-based network traffic load simulation is provided. The system includes one or more processors and a computer-readable storage medium, coupled to the one or more processors, storing program instructions that, when executed by the one or more processors, cause the one or more processors to perform operations. The operations monitor a set of activities for a set of applications. A network load simulation for the set of applications is generated based on the set of activities. A contextual change is identified for an application of the set of applications. The operations generate a virtual reality visualization of the network load simulation based on the contextual change. A parameter change is detected from a user interaction within the virtual reality visualization of the network load simulation. The operations dynamically modify the network load simulation within the virtual reality visualization in response to the parameter change.

According to an embodiment described herein, a computer program product for virtual reality-based network traffic load simulation is provided. The computer program product includes a computer-readable storage medium having program instructions embodied therewith, the program instructions being executable by one or more processors to cause the one or more processors to monitor a set of activities for a set of applications. A network load simulation for the set of applications is generated based on the set of activities. A contextual change is identified for an application of the set of applications. The computer program product generates a virtual reality visualization of the network load simulation based on the contextual change. A parameter change is detected from a user interaction within the virtual reality visualization of the network load simulation. The computer program product dynamically modifies the network load simulation within the virtual reality visualization in response to the parameter change.

DETAILED DESCRIPTION

Figure 1:
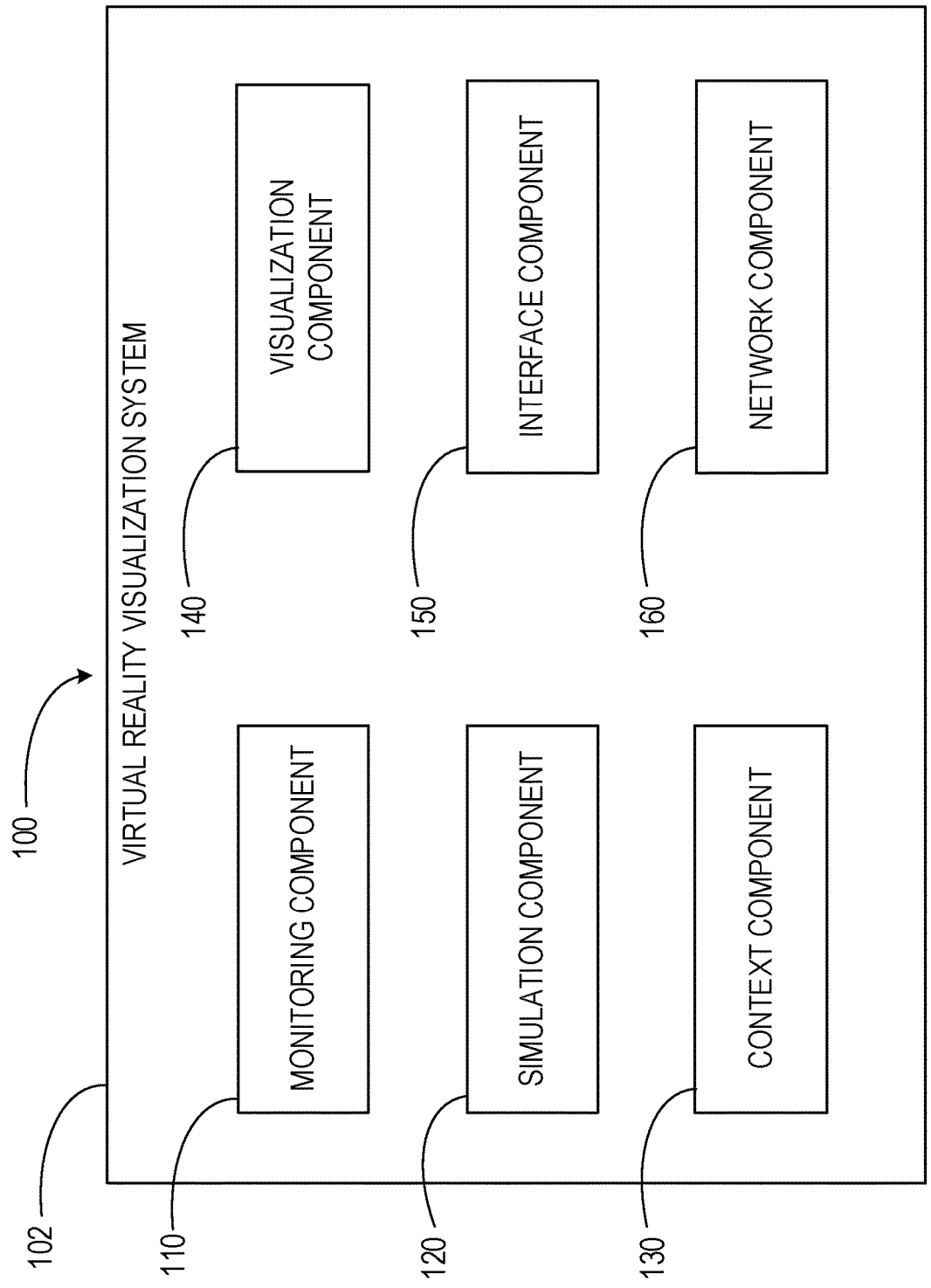
FIG. 1 depicts a block diagram of a computing environment for implementing concepts and computer-based methods, according to at least one embodiment.

The present disclosure relates generally to methods for virtual reality visualizations. More particularly, but not exclusively, embodiments of the present disclosure relate to a computer-implemented method for virtual reality-based network traffic load simulation. The present disclosure relates further to a related system for virtual reality visualizations, and a computer program product for operating such a system.

Data moving across a communications network in a given time period is known as network traffic. This data is generally divided and encapsulated into network packets that form the load placed on the communications network. Systems have been created to measure, control, and simulate network traffic. Organization of network traffic can help to ensure quality of service in a given network. The data composing network traffic is often largely generated by applications, in an application landscape, communicating with one another through the communications network. Within the application landscape, maintenance is often performed on applications as well as system resources used by those applications. Part of this maintenance includes migrating data from one application to another. These maintenance activities give rise to additional network traffic.

Where application maintenance and migration are performed for an application landscape, changes occur in the network traffic load of a communication network. The change in network traffic load can lead to temporary disruption of the communications network or network traffic. In addition to applications subject to maintenance and migration, ancillary or related applications may also be impacted. However, systems used to monitor, measure, control, and simulate network traffic often encounter difficulty in adequately predicting, measuring, controlling, and simulating network traffic when including periodic maintenance activities, data migration, and incorporation of new applications into an application landscape. Current systems often fail to accurately or properly simulate network loads based on changes in contextual situations relating to application maintenance, data migration, application addition, and application removal. Further, current systems often fail to adequately plan for network load management.

Embodiments of the present disclosure enable proactive virtual reality simulation of network traffic loads. The network traffic loads may be simulated based on context changes for applications or physical network components. In some embodiments, the present disclosure provides methods and systems for simulating context change situations within an application landscape including simulating maintenance tasks, data migration, addition of users to applications, modifying job processing schedules, and addition of new applications to an application landscape. In some embodiments, the present disclosure enables modification of the network traffic load through interaction with the virtual reality simulation. Embodiments of the present disclosure allow an administrator to reschedule a job, modify network traffic parameters, identify migration and maintenance timelines, and generate associated maintenance and network traffic load plans.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a virtual reality visualization system 102. The virtual reality visualization system 102 may comprise a monitoring component 110, a simulation component 120, a context component 130, a visualization component 140, an interface component 150, and a network component 160. The monitoring component 110 activities for sets of applications, generates application metadata, and generates network load histories. The simulation component 120 generates network load simulations for sets of applications. The context component 130 identifies contextual changes for applications within a set of applications. The visualization component 140 generates virtual reality visualizations for network load simulations. The interface component 150 detects parameter changes and user interface actions within virtual reality visualizations of network load simulations. The network component 160 identifies and generates notifications representing network assets affected by modified network load simulations. Although described with distinct components, it should be understood that, in at least some embodiments, components may be combined or divided, and/or additional components may be added, without departing from the scope of the present disclosure.

Figure 2:
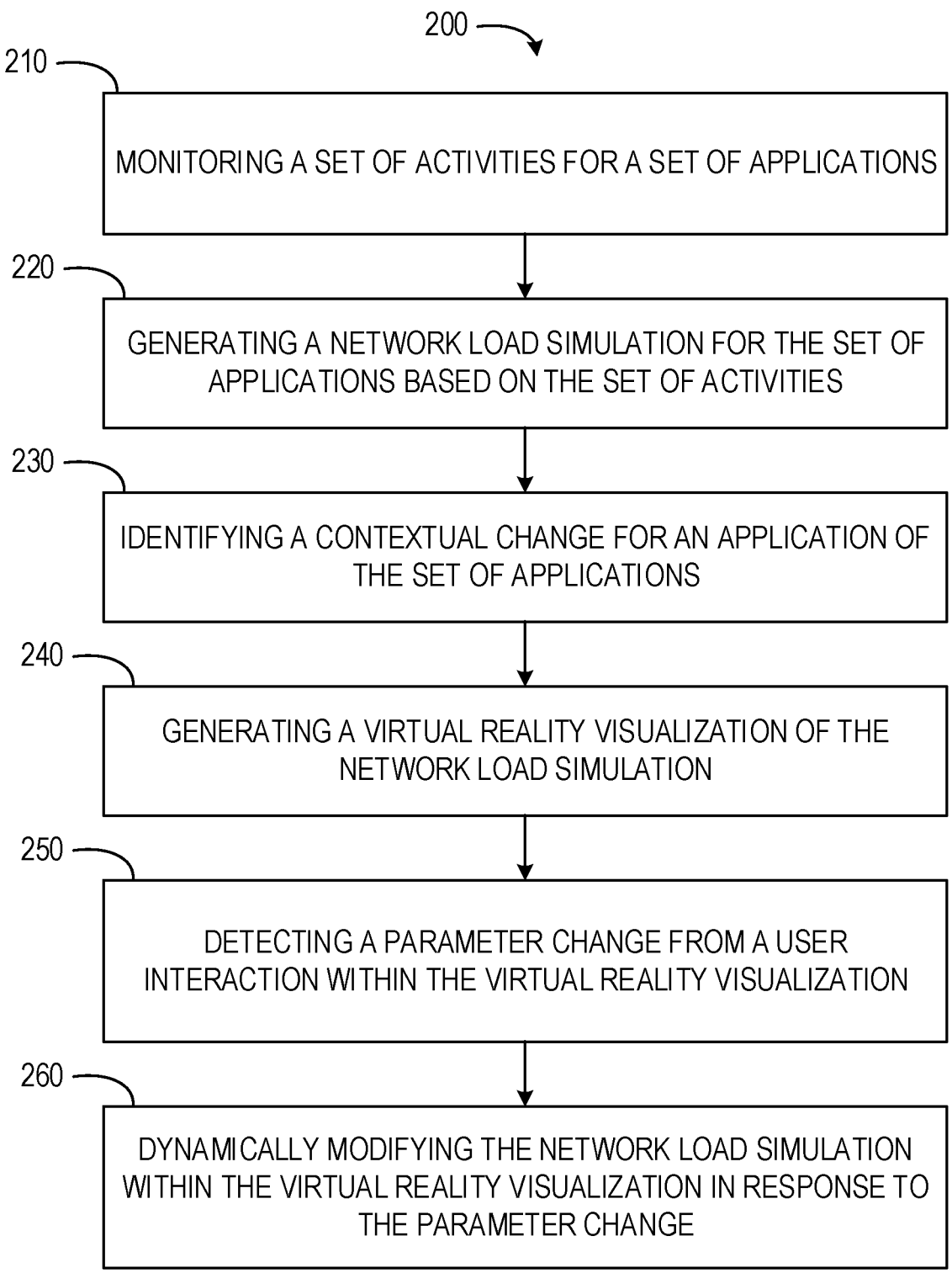
FIG. 2 depicts a flow diagram of a computer-implemented method for virtual reality-based network traffic load simulation, according to at least one embodiment.

Referring now to FIG. 2, a flow diagram of a computer-implemented method 200 is shown. The computer-implemented method 200 is a method for virtual reality-based network traffic load simulation. In some embodiments, the computer-implemented method 200 may be performed by one or more components of the computing environment 100, as described in more detail below.

At operation 210, the monitoring component 110 monitors a set of activities for a set of applications. The set of applications may exist in an application landscape. Each application of the set of applications may communicate with one or more other applications. Initially, the monitoring component 110 may identify each application individually as part of monitoring the set of activities. In some embodiments, the monitoring component 110 generates a network load history based on the set of activities for the set of applications. The set of activities may be used to generate a knowledge corpus for the set of applications, an environment in which the set of applications operate, and physical components over which the network load is transferred and the set of applications operate. The monitoring component 110 may monitor the set of activities or gather the information from application logs, data volume, upstream applications, downstream applications, job scheduling, numbers of users, frequency of usage, types of data used, combinations thereof, and any other suitable source of application activity data.

In some embodiments, the set of activities include monitoring of ad-hoc network traffic load. The ad-hoc network traffic load may include traffic load increases and decreases. The monitoring may also include a time interval in which the ad-hoc network traffic load remains in a changed state. In such instances, the monitoring component 110 may identify dependent and independent components or devices associated with the ad-hoc network traffic load increases or decreases and associated applications of the set of applications.

The monitoring component 110 may generate application metadata for each application of the set of applications. The application metadata may be generated based on monitoring the set of activities. In some embodiments, the application metadata represents a priority of an application, a current context for the application, amounts of data used, types of activities performed, applications with which the application communicates, components associated with or relied upon by the application, or any other suitable information describing the application.

At operation 220, the simulation component 120 generates a network load simulation for the set of applications based on the set of activities. In some embodiments, the network load simulation is generated based on the set of activities being monitored and the network load history. The network load simulation may be an end to end network load simulation. The network load simulation is generated with an existing structure of the application landscape for the set of applications.

In some embodiments, the simulation component generates the network load simulation by receiving the set of activities monitored by the monitoring component 110. The simulation component 120 may apply historical learning algorithms to the set of activities. The simulation component 120, operating as a digital twin computing system, may create the network load simulation in an application landscape determined or identified from the set of activities and the set of applications associated with the set of activities.

At operation 230, the context component 130 identifies a contextual change for an application of the set of applications. The context change may be understood as a change to an environment, application, components, or other associated aspects which have an impact on a network traffic load. The context change may be identified, at least in part, based on the knowledge corpus. In some embodiments, the context component 130 determines a subset of applications affected by the contextual change. The contextual change may be a current contextual change, happening in real time, or a future contextual change. The future contextual change may be predicted or identified based on a scheduled maintenance task, maintenance period, data migration, or other known and upcoming contextual situation which may impact the network traffic load.

The context component 130 may identify the contextual change as well as a reason for the contextual change. In some instances, changes in contextual situations include increases in users, parallel job processing, migration of data, deployment of new applications, or maintenance of an application, combinations thereof, or any other suitable contextual change. Reasons for contextual changes may include legislative or norm changes, policy changes, time of year. For example, context change reasons may include end of month human resource actions, an application priority change, governmental changes impacting the application, policy changes of the application, addition of a new application which impacts an existing application, addition of data sources, or any other suitable reason for a context change.

At operation 240, the visualization component 140 generates a virtual reality visualization of the network load simulation. In some embodiments, the virtual reality visualization is generated based on the contextual change. The virtual reality visualization may include a virtual reality interface representing the network load, applications contributing to the network load, and computing devices associated with the applications or application environment. In some embodiments, the virtual reality visualization includes a representation of an unbalanced network load created by or in response to the contextual change.

The virtual reality visualization may include a plurality of user interface elements. The user interface elements may correspond to parameters capable of being changed by a user of the virtual reality visualization. The parameters may include application parameters, application settings, network parameters, network settings, network traffic settings (e.g., packet size), web settings, database settings, combinations thereof, or any other suitable settings or configuration elements. The parameters may be associated with individual applications of the set of applications, the application environment, logical network structure, physical networking components or devices, computing devices associated with individual applications, or physical devices associated with the application environment.

At operation 250, the interface component 150 detects a parameter change from a user interaction. In some embodiments, the user interaction is detected within the virtual reality visualization of the network load simulation. The digital twin simulation of the virtual reality visualization of the network load simulation may enable the user to take actions to change parameters and visualize network traffic load management within the network load simulation. For example, the user interaction may include controlling a number of users interacting with the set of applications. The user interaction may also include managing network infrastructure, changing maintenance or job schedules, reducing data packet sizes, reducing data packet sizes per time period (e.g., per minute), combinations thereof, or any other suitable network traffic load management. Where the application environment is cloud based, the virtual reality visualization system 102 may be integrated with Docker-Kubernetes to enable associated parameters to be changed by user interaction with the network load simulation.

In some embodiments, the context component 130 and the simulation component 120 cooperate to generate a suggested parameter change. The suggested parameter change may be a set of suggested parameter changes from which a user may select one or more parameter changes. In some instances, the suggested parameter change is generated in response to identifying the contextual change. In some embodiments, the suggested parameter change is generated based on a network load history and the knowledge corpus. The suggested parameter change may be associated with improvement to network traffic flow.

In embodiments where the monitoring component 110 monitors ad-hoc network traffic load increases or decreases, the context component 130 and the simulation component 120 may proactively notify a user of the ad-hoc network traffic load changes. In some instances, the context component 130 and the simulation component 120 cooperate with the interface component 150 to generate a notification of the ad-hoc network traffic load changes. The notification may be presented to the user based on user interactions with the network load simulation. In some instances, the user interactions that trigger the notification may be user interactions associated with tasks, settings, applications, or parameters that may be impacted by the ad-hoc network traffic load changes. Similarly, the notification may be presented to the user where the user interactions are associated with tasks, settings, applications, or parameters that may leverage or improve performance based on the ad-hoc network traffic load changes.

In some embodiments, the context component 130 and the simulation component 120 cooperate to generate a time recommendation for the contextual change. For example, the time recommendation may be a recommended time for scheduling a data migration job. The time recommendation may be based on the network load simulation, the parameter change, and the subset of applications affected by the contextual change.

At operation 260, the visualization component 140 dynamically modifies the network load simulation within the virtual reality visualization. In some embodiments, the network load simulation is modified in response to the parameter change. The visualization component 140 may provide information from the dynamic modification of the network load simulation to one or more components of the virtual reality visualization system 102 to add simulation results, representing an impact of parameter changes, to the knowledge corpus generated for the set of activities. In some embodiments, in response to dynamically modifying the network load simulation, the visualization component 140 cooperates with the interface component 150 and the network component to match or copy at least a portion of the parameter changes to one or more physical devices.

In some embodiments, the network component 160 determines one or more network assets affected by the modified network load simulation. The one or more network assets may be physical computing devices associated with the set of applications, the application environment, the network, and the virtual reality visualization system 102. The one or more network assets may include mobile computing devices, desktop computing devices, servers, switches, network or communication nodes, combinations thereof, and any other suitable physical networking devices.

In some embodiments, the network component 160 generates a network asset notification. The network asset notification may be generated to represent the one or more network assets affected by the modified network load simulation. In some embodiments, the network asset notification includes a change for the network asset associated with the parameter change. The network asset notification may provide a notification to a user or log information indicating a change to a setting, preference, configuration, or other aspect of the network asset to match the parameter change causing the dynamic modification of the network load simulation. In some embodiments, the notification enables user interaction. In such instances, the notification provides a prospective change to a specified network asset reflecting the parameter change and a user interface element. Selection of the user interface element may apply the prospective change to the specified network asset.

Figure 3:
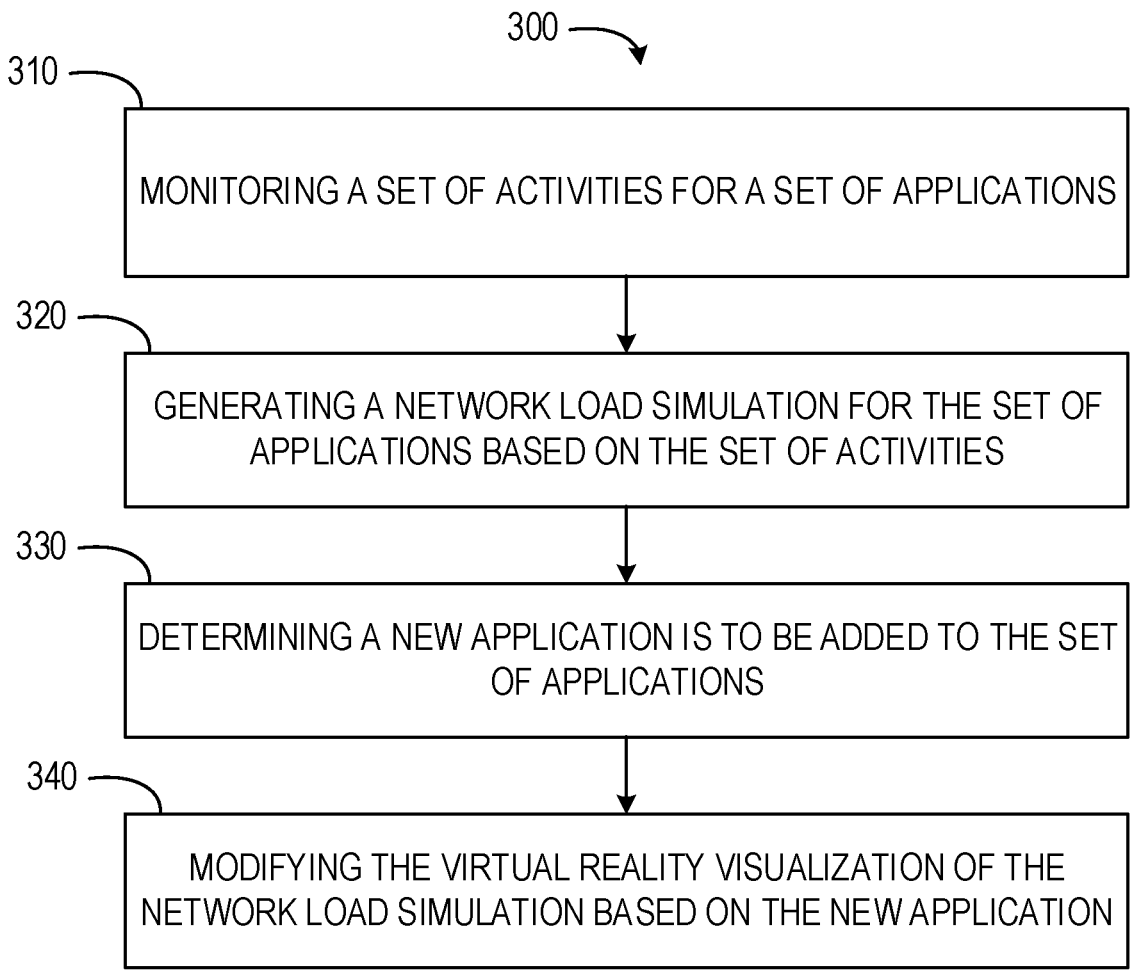
FIG. 3 depicts a flow diagram of a computer-implemented method for virtual reality-based network traffic load simulation, according to at least one embodiment.

FIG. 3 shows a flow diagram of an embodiment of a computer-implemented method 300 for virtual reality-based network traffic load simulation. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the monitoring component 110 monitors a set of activities for a set of applications. The set of activities may be monitored in real-time. In some embodiments, the set of activities are monitored over a period of time. The period of time may be contiguous or include a set of individual time segments. In such embodiments, the monitoring component 110 map or correlate the set of activities and varying levels of network traffic load to specified times or time ranges. In some embodiments, the set of activities are monitored in a manner similar to or the same as described above with respect to operation 210.

In operation 320, the simulation component 120 generates a network load simulation for the set of applications based on the set of activities. In some embodiments, the network load simulation is generated for real-time network communications. The network load simulation may also be generated for historical network communications. The historical network communications may be associated with specified time periods, specified network conditions, specified application conditions or contexts, or any other network traffic load information. In some embodiments, the network load simulation is generated in a manner similar to or the same as described above with respect to operation 220.

In operation 330, the context component 130 determines a new application is to be added to the set of applications. In some embodiments, the new application represents at least a portion of a contextual change. The context component 130 may determine information relating to the new application for the contextual change. In some embodiments, the context component 130 performs an application code analysis and test results, identifies requirement specifications for the application, determines a number of users to be associated with the new application, combinations thereof, and any other suitable information gleaned from the new application, metadata for the new application, or information provided by an administrator.

In operation 340, the visualization component 140 modifies the virtual reality visualization of the network load simulation. In some embodiments, the virtual reality visualization is modified based on the new application. The visualization component 140 may modify the virtual reality visualization to simulate how adding the new application impacts the network traffic load. The visualization component 140 may determine the impact of the new application on an existing simulated network traffic load. In some instances, the visualization component 140 modifies virtual reality visualization with a plurality of options. The plurality of options may be selectable by an administrator to provide a plurality of network load simulations. Each network load simulation may be associated with a setting, a context, a requirement, or other option capable of being adjusted or modified by the administrator. In such instances, the plurality of network load simulations may reflect options, settings, or installation differences available to the administrator for the new application. The visualization component 140 may initially present the network load simulation using default options. In such instances, the visualization component 140 may dynamically modify the network load simulation to present a modified network load simulation of the plurality of network load simulations as the administrator selects between differing options or settings of the new application.

In some embodiments, the visualization component initially presents the network load simulation using recommended resources or settings for the new application. The recommended resources and settings may be generated by machine learning models of the visualization component and the context component 130 configuring an AI recommendation algorithm to reflect settings and resources for the new application to minimize impact on the network load. In some embodiments, the AI recommendation algorithm may also recommend new additional resources and overwrite configuration of one or more settings of the set of applications, a system, or an environment in which the set of applications operate to address the resources used by the new application. In some instances, the configurations may be overwritten for a period of time during which the resources are being used by the new application. Where the resource usage is persistent for an extended duration or a new component is added to the environment for the set of applications, the overwritten configuration may be maintained or dynamically modified based on new components added or additional resources being consumed.

Figure 4:
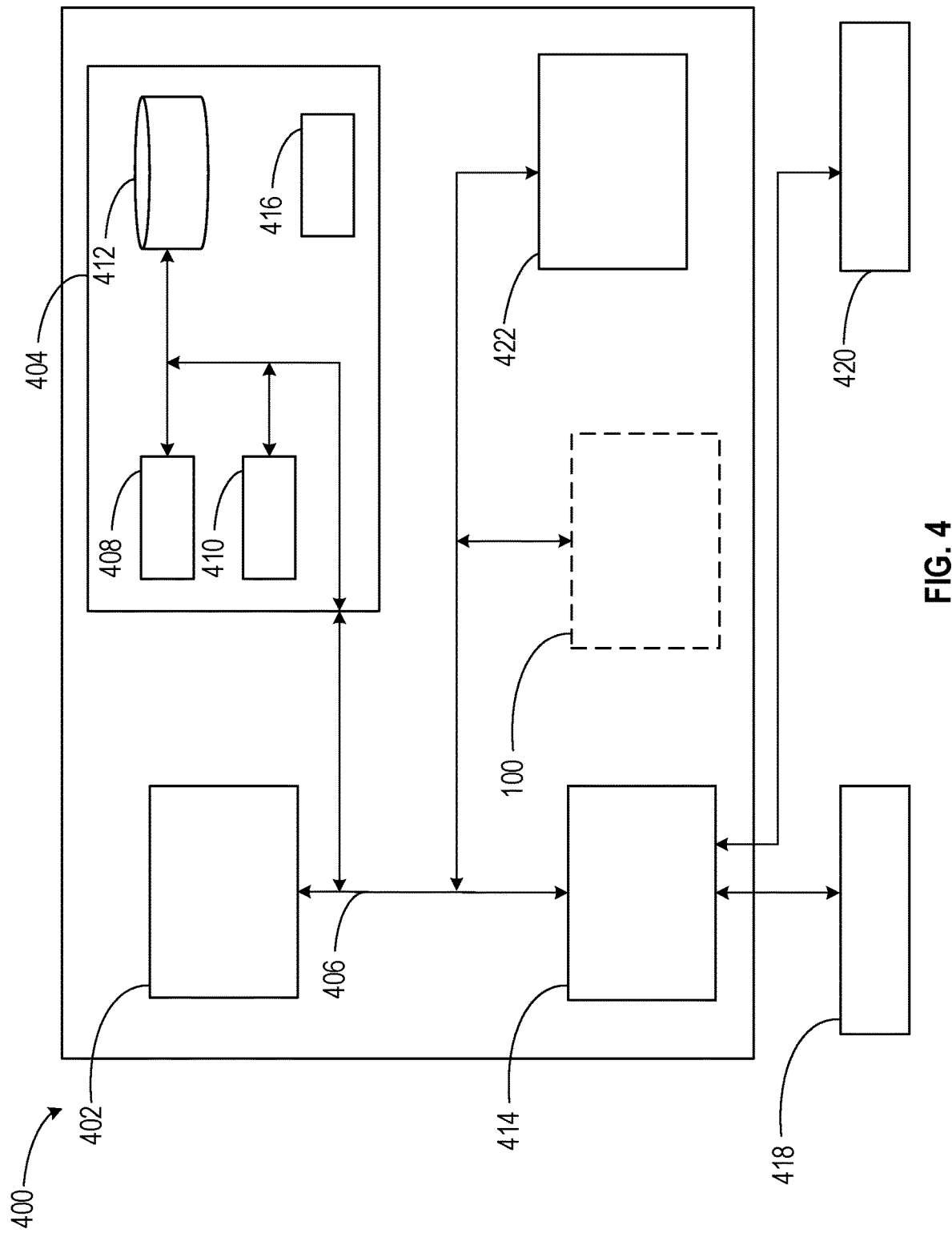
FIG. 4 depicts a block diagram of a computing system for virtual reality-based network traffic load simulation, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for virtual reality-based network traffic load simulation.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the monitoring component 110, the simulation component 120, the context component 130, the visualization component 140, the interface component 150, and the network component 160, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
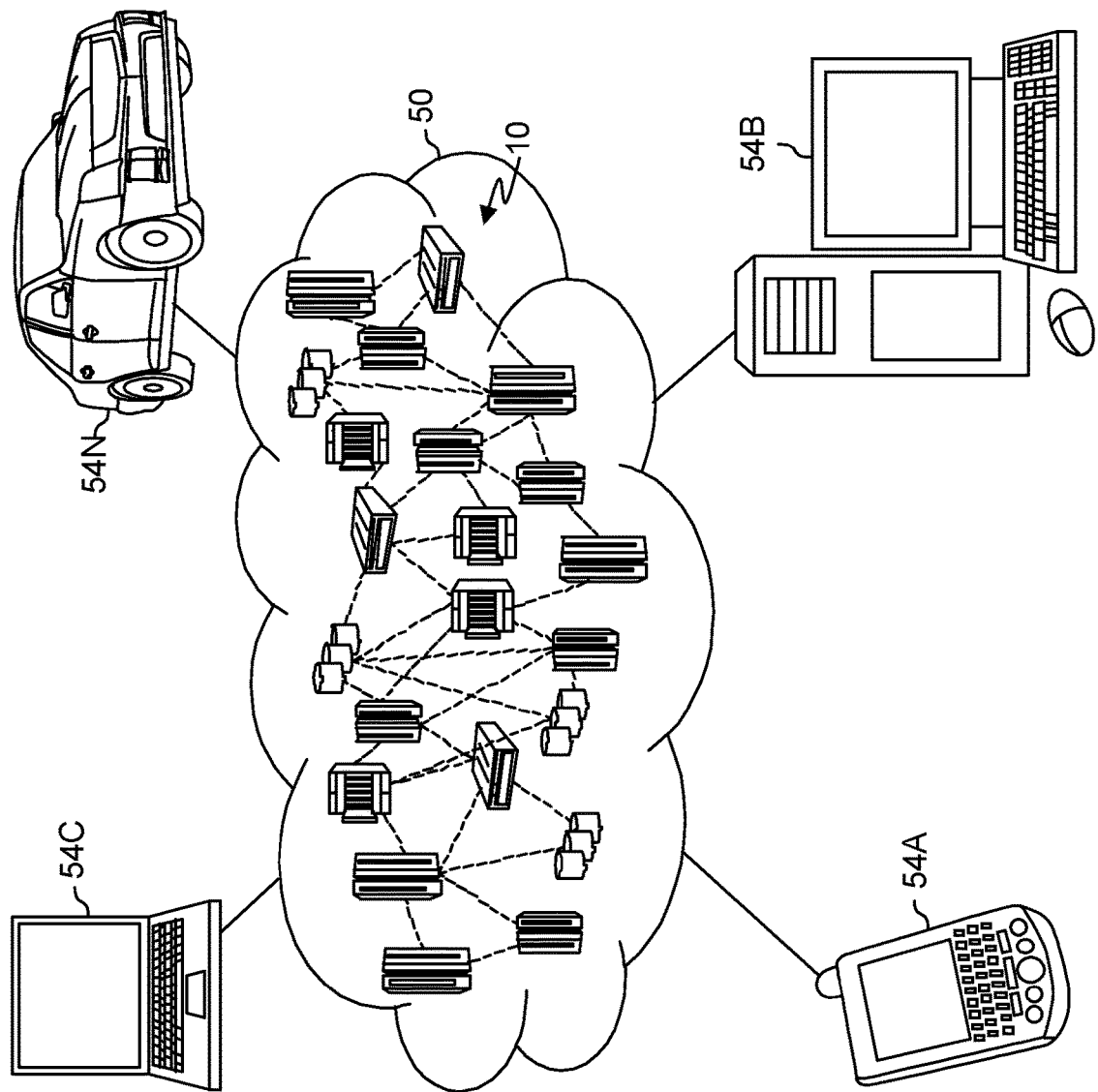
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
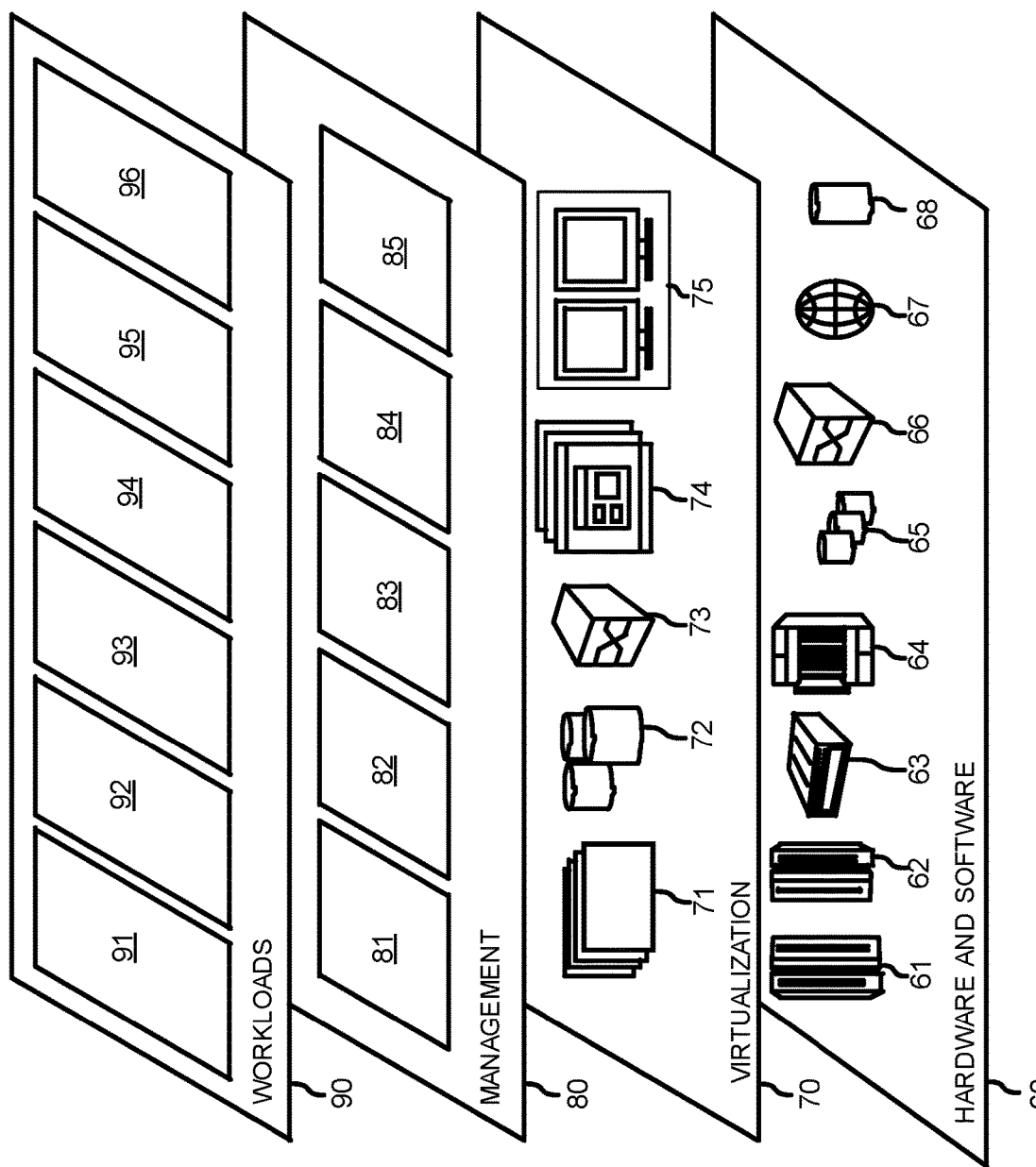
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual reality visualization processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
monitoring a set of activities for a set of applications within a network environment;
generating a network load simulation for the set of applications based on the set of activities;
simulating a contextual change for an application of the set of applications, wherein the simulating of the context change is selected from the group consisting of simulating maintenance tasks, data migration, addition of users to applications, modifying job processing schedules, and addition of new applications to an application landscape;
generating a virtual reality visualization of the network load simulation based on the contextual change;
detecting a parameter change from a user interaction within the virtual reality visualization of the network load simulation;
dynamically modifying the network load simulation within the virtual reality visualization in response to the parameter change; and
implementing a change to at least one element of the network environment in response to: a) the detecting of the parameter change, and b) the dynamically modifying of the network load simulation.

2. The method of claim 1, further comprising:
determining a subset of applications affected by the contextual change.

3. The method of claim 2, further comprising:
generating a time recommendation for the contextual change based on the network load simulation, the parameter change, and the subset of applications affected by the contextual change.

4. The method of claim 1, further comprising:
determining a new application is to be added to the set of applications, the new application representing at least a portion of the contextual change; and
modifying the virtual reality visualization of the network load simulation based on the new application.

5. The method of claim 1, further comprising:
generating a network load history based on the set of activities for the set of applications; and
in response to identifying the contextual change, generating a suggested parameter change based on the network load history.

6. The method of claim 1, further comprising:
determining one or more network assets affected by the modified network load simulation; and
generating a network asset notification representing the one or more network assets.

7. The method of claim 1, further comprising:
generating application metadata for each application of the set of applications based on monitoring the set of activities.

8. A system, comprising:
one or more processors; and
a computer-readable storage medium, coupled to the one or more processors, storing program instructions that, when executed by the one or more processors, cause the one or more processors to perform operations comprising:
monitoring a set of activities for a set of applications within a network environment;
generating a network load simulation for the set of applications based on the set of activities;
simulating a contextual change for an application of the set of applications, wherein the simulating of the context change is selected from the group consisting of simulating maintenance tasks, data migration, addition of users to applications, modifying job processing schedules, and addition of new applications to an application landscape;
generating a virtual reality visualization of the network load simulation based on the contextual change;
detecting a parameter change from a user interaction within the virtual reality visualization of the network load simulation;
dynamically modifying the network load simulation within the virtual reality visualization in response to the parameter change; and
implementing a change to at least one element of the network environment in response to: a) the detecting of the parameter change, and b) the dynamically modifying of the network load simulation.

9. The system of claim 8, wherein the operations further comprise:
determining a subset of applications affected by the contextual change.

10. The system of claim 9, wherein the operations further comprise:
generating a time recommendation for the contextual change based on the network load simulation, the parameter change, and the subset of applications affected by the contextual change.

11. The system of claim 8, wherein the operations further comprise:
determining a new application is to be added to the set of applications, the new application representing at least a portion of the contextual change; and
modifying the virtual reality visualization of the network load simulation based on the new application.

12. The system of claim 8, wherein the operations further comprise:
generating a network load history based on the set of activities for the set of applications; and
in response to identifying the contextual change, generating a suggested parameter change based on the network load history.

13. The system of claim 8, wherein the operations further comprise:
determining one or more network assets affected by the modified network load simulation; and
generating a network asset notification representing the one or more network assets.

14. The system of claim 8, wherein the operations further comprise:
generating application metadata for each application of the set of applications based on monitoring the set of activities.

15. A computer program product comprising a computer readable storage medium having program instructions embodied therewith, the program instructions being executable by one or more processors to cause the one or more processors to perform operations comprising:
monitoring a set of activities for a set of applications within a network environment;
generating a network load simulation for the set of applications based on the set of activities;
simulating a contextual change for an application of the set of applications, wherein the simulating of the context change is selected from the group consisting of simulating maintenance tasks, data migration, addition of users to applications, modifying job processing schedules, and addition of new applications to an application landscape;
generating a virtual reality visualization of the network load simulation based on the contextual change;
detecting a parameter change from a user interaction within the virtual reality visualization of the network load simulation;
dynamically modifying the network load simulation within the virtual reality visualization in response to the parameter change; and
implementing a change to at least one element of the network environment in response to:
a) the detecting of the parameter change, and b) the dynamically modifying of the network load simulation.

16. The computer program product of claim 15, wherein the operations further comprise:
determining a subset of applications affected by the contextual change; and
generating a time recommendation for the contextual change based on the network load simulation, the parameter change, and the subset of applications affected by the contextual change.

17. The computer program product of claim 15, wherein the operations further comprise:
determining a new application is to be added to the set of applications, the new application representing at least a portion of the contextual change; and
modifying the virtual reality visualization of the network load simulation based on the new application.

18. The computer program product of claim 15, wherein the operations further comprise:
generating a network load history based on the set of activities for the set of applications; and
in response to identifying the contextual change, generating a suggested parameter change based on the network load history.

19. The computer program product of claim 15, wherein the operations further comprise:
determining one or more network assets affected by the modified network load simulation; and
generating a network asset notification representing the one or more network assets.

20. The computer program product of claim 15, wherein the operations further comprise:
generating application metadata for each application of the set of applications based on monitoring the set of activities.

* * * * *